US012689863B2

United States Patent

(12) United States Patent
Terlizzi

(10) Patent No.: US 12,689,863 B2
(45) Date of Patent: Jul. 21, 2026

(54) AUDIO SEAL MEASUREMENTS

(71) Applicant: Apple Inc., Cupertino, CA (US)

(72) Inventor: Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 18/243,900

(22) Filed: Sep. 8, 2023

(65) Prior Publication Data

US 2024/0107247 A1 Mar. 28, 2024

Related U.S. Application Data

(60) Provisional application No. 63/409,383, filed on Sep. 23, 2022.

(51) Int. Cl.

*H04R 29/00* (2006.01)
*H04R 1/10* (2006.01)

(52) U.S. Cl.

CPC ......... *H04R 29/001* (2013.01); *H04R 29/008* (2013.01); *H04R 1/1016* (2013.01); *H04R 2460/15* (2013.01)

(58) Field of Classification Search

CPC .. H04R 29/001; H04R 29/008; H04R 1/1016; H04R 2460/15

See application file for complete search history.

(56) References Cited

U.S. PATENT DOCUMENTS

2014/0037096 A1* 2/2014 Duisters ................. H04R 25/30 381/58
2019/0278556 A1* 9/2019 Usher .................. H04R 1/1041
2023/0328435 A1* 10/2023 Dickson ................. H04R 29/00 381/74

* cited by examiner

*Primary Examiner* — Mark Fischer

(74) *Attorney, Agent, or Firm* — Kilpatrick Townsend & Stockton LLP

(57) ABSTRACT

Examples can provide circuits, methods, and apparatus that can determine a quality of a seal formed using an audio device, can inform a user of the quality of the seal, and can help the user to improve the quality of the seal.

19 Claims, 9 Drawing Sheets

400

CONTEXT SPECIFIC GUIDELINES

| PARAMETER: | LISTENING TO MUSIC | LISTENING TO NEWS | MEETING | EXERCISE | SLEEP | LOUD ENVIRONMENT |
|---|---|---|---|---|---|---|
| WHEN TO TEST | PERIODICALLY | PERIODICALLY | PERIODICALLY | INFREQUENT | NONE | PERIODICALLY |
| TEST SIGNAL TO USE | INAUDIBLE | INAUDIBLE | INAUDIBLE | INAUDIBLE | NONE | INAUDIBLE |
| THRESHOLD | HIGH | MODERATE | LOW | LOW OR ZERO | ZERO | HIGH |
| PROVIDE RESULTS? | FOR POOR SEAL | FOR POOR SEAL | FOR POOR SEAL | RARE | NO | FOR POOR AND GOOD SEALS |
| HOW TO PROVIDE? | HAPTIC OR VISUAL | HAPTIC OR VISUAL | HAPTIC OR VISUAL | ANY | NONE | ANY |
| SUGGESTIONS | NONE | LIMITED | NONE | NONE | NONE | YES |
| | 410 | 420 | 430 | 440 | 450 | 460 |

FIG. 4

500

GENERAL GUIDELINES

| PARAMETER: | LIKELY TO CARE ABOUT SEAL | SEAL LIKELY TO BE UNSTABLE | HEARING AT RISK |
| --- | --- | --- | --- |
| WHEN TO TEST | PERIODICALLY | INFREQUENT | PERIODICALLY |
| TEST SIGNAL TO USE | INAUDIBLE | INAUDIBLE | INAUDIBLE |
| THRESHOLD | HIGH | LOW OR ZERO | HIGH |
| PROVIDE RESULTS? | FOR POOR SEAL | RARE | FOR POOR AND GOOD SEALS |
| HOW TO PROVIDE? | HAPTIC OR VISUAL | ANY | ANY |
| SUGGESTIONS | LIMITED OR NONE | NONE | YES |
| | 510 | 520 | 530 |

FIG. 5

600

DEFAULT GUIDELINES

| PARAMETER: | |
|---|---|
| WHEN TO TEST | PERIODICALLY |
| TEST SIGNAL TO USE | INAUDIBLE |
| THRESHOLD | MODERATE |
| PROVIDE RESULTS? | FOR POOR SEAL |
| HOW TO PROVIDE? | ANY |
| SUGGESTIONS | YES |

610

FIG. 6

AUDIO SEAL MEASUREMENTS

CROSS-REFERENCES TO RELATED APPLICATIONS

The present application claims the benefit of and priority to United States provisional application 63/409,383, filed Sep. 23, 2022, which is incorporated by reference.

BACKGROUND

Audio products, such as headphones and earbuds, have become ubiquitous. They have proven to be useful in myriad situations and have worked their way into our pockets, backpacks, and gym bags as a result. The increase in frequency of internet-based business meetings, family gatherings, and education classes has led to an even broader adoption of these products. As the quality of these devices has improved, they are increasingly used in more challenging applications. For example, earbuds can now commonly used to block environmental noise and are often used by commentators on new programs.

The degree to which these audio products can meet these new challenges can be determined in large part by how well they fit a user. For example, the degree to which a proper seal is made between headphones and a side of a user's head can determine how well the headphones work. Similarly, a seal to a user's ear or a seal to a user's ear canal can determine how well an on-ear pair of headphones or a pair of earbuds might work. Headphones or earbuds with a poor seal might not provide the highest quality operation that could otherwise be achieved. Accordingly, it can be desirable to be able to determine the quality of a seal made by an audio product.

A user might be unaware of the presence of a poor or low-quality seal when using headphones or earbuds. For example, blame for low-quality audio during an internet business meeting might be mistaken placed on low-bandwidth or network congestion. Accordingly, it can be desirable to inform a user of the presence of a poor or low-quality seal.

Once a user is informed of a poor or low-quality seal, mitigation steps can be taken. But the best mitigation steps might not be obvious to a user. Accordingly, it can be desirable to have the capability of helping a user to achieve a better fit.

Thus, what is needed are circuits, methods, and apparatus that can determine a quality of a seal formed using an audio device, can inform a user of the quality of the seal, and can help the user to improve the quality of the seal.

SUMMARY

An illustrative embodiment of the present invention can provide circuits, methods, and apparatus that can determine a quality of a seal formed using an audio device, can inform a user of the quality of the seal, and can help the user to improve the quality of the seal. An illustrative embodiment of the present invention can improve a user's experience when using an audio device. A poor seal between an earbud and a user's ear canal can degrade an audio signal provided by the earbud to the user. Similarly, a poor seal between a side of a user's head and over-the-ear headphones, or a poor seal between a user's ear and on-ear headphones, can degrade an audio signal heard by the user. For example, a poor audio seal in any of these situations can degrade a user's experience. By determining that a seal is low-quality and notifying the user, the user can take steps to improve the audio seal. As a result, the audio signal received by the user can be improved. Embodiments of the present invention can be useful when listening to music. They can also be useful by reducing frustration and miscommunication during business meetings conducted over the internet or phone.

Embodiments of the present invention can also be useful when an audio device operates in a transparency mode. While in a transparency mode, ambient audio can be provided to a user along with or in place of other audio content, such a music. The ambient audio can be received by a microphone on an outside of a user's head and passed to the user. The ambient audio can be provided to the user at a signal level or volume that closely matches the level of ambient audio, the ambient audio can be amplified and provided to the user, the ambient audio can be attenuated and provided the user, or the level of transparency can be adjustable throughout some or all of this range. A poor seal can degrade the audio signal being provided to the user making it more difficult to hear their surroundings. Embodiments of the present invention can help a user to improve the seal to improve the sound replication of the ambient audio provided to the user. This can improve a user's ability to hold a conversation while wearing headphones or earbuds. This can also improve a user's ability to be aware of present conditions in their immediate environment.

Embodiments of the present invention can also help protect a user's hearing. Earbuds or headphones can be worn where a user can be exposed to loud sounds. Where a poor seal is made, the attenuation that could otherwise be provided by the audio device can be reduced. This can put a user at a risk of long-term hearing loss or damage. Embodiments of the present invention can alert and help a user to improve the seal for better hearing protection.

Embodiments of the present invention can also help protect a user's hearing when operating in a transparency mode. For example, the amount of ambient audio provided to the user can be varied depending on its volume. Where ambient volume is excessive, the ambient audio can be attenuated. Where a sudden noise occurs, the amount of attenuation can be quickly increased for further protection.

Power stored in the audio devices can be wasted when a poor seal is present. For example, an amplification might need to be increased to compensate for a poor seal. Other functions of the audio devices, such as noise cancellation, might try to compensate for a poor seal. Accordingly, by helping a user improve the quality of a seal formed by an audio device, embodiments of the present invention can reduce power consumption.

Various measurements can be made to determine the quality of a seal. For example, a speaker of an audio device can provide a test signal to a user. Changes in pressure near a surface of the speaker can be monitored, for example by using a barometer. For example, when an earbud is in a user's ear canal, changes in pressure in the user's ear canal be measured. Small changes in pressure can indicate leakage between the earbud and ear canal, indicating a poor fit, while more substantial changes can indicate a better or good fit. Similarly, when cushions of headphones are on or around a user's ear, changes in pressure in a region bounded by the headphones can be monitored during a test signal. Again, small changes in pressure can indicate leakage between the cushions and user's ear, indicating a poor fit, while more substantial changes can indicate a better or good fit.

Measurements to determine the quality of a fit can be made in other ways. For example, a speaker of an audio device can provide a test signal to a user. A microphone that measures the level of test signal that is present outside of the sealed region can be measured. When a user wears an earbud, the sealed region can be between the speaker and user's ear canal, and the microphone can be external to the sealed region. Similarly, when a user wears headphones, the sealed region can be somewhat bounded by the headphone cushions and the microphone can be external to the sealed region. Based on the amount of test signal received at the microphone, a determination of fit can be made. For example, an excessive amount of test signal being received at the microphone can indicate a poor fit, while a lower amount of test signal can indicate a better or good fit.

Measurements to determine fit can also be made by monitoring an impedance of a speaker of an audio device. For example, the impedance of a speaker of an audio device as it provides a test signal to a sealed area described above can be measured. When a poor seal is present, the resistance to movement of the speaker due to air pressure can be reduced, thereby reducing the speaker impedance. Conversely, when a good seal is present, the resistance to movement of the speaker due to air pressure can be increased, thereby increasing the speaker impedance. A low speaker impedance can indicate a poor seal, while a higher speaker impedance can indicate a better or good fit.

Measurements to determine fit can also be made by taking a user's temperature. For example, an earbud can include a temperature sensor. The temperature sensor can measure a temperature at a location at a surface of the earbud that would be expected to be in contact with the user. A measured temperature within an expected range can then be used as a proxy for a good fit. A measured temperature below an expected range can indicate a poor fit.

An illustrative embodiment of the present invention can determine a quality of a seal formed using an audio device. For example, the quality of a seal between a user's ear canal and an ear-tip of an earbud can be determined. Alternatively, a quality of a seal between a user and an over-the-ear headphone, an on-the-ear headphone, or other in-ear headphone (or earbud) can be determined. This quality determination can be made after it has been determined that a user is wearing the audio device. For example, the seal quality determination can be made after is has been determined that a user has inserted an ear-tip of an earbud into an ear canal, or after it has been determined that the user is wearing an over-the-ear headphone, an on-the-ear headphone, or other in-ear headphone. This quality determination can be made by providing a test signal using a speaker of the audio device and a then making a measurement indicative of the quality of the seal. In these and other embodiments of the present invention, different types of test signals can be provided by an audio device. For example, an audible signal, such as music, notes, white noise, a signal having a ramping tone, a stepped tone, or other types of audible test signals can be provided. A test signal can also be inaudible. For example, inaudible tones having a frequency twice above the typical hearing range or approximately 44 kHz can be used, as can inaudible tones below the typical hearing range of approximately 20 Hz. An inaudible test signal having a ramping tone, a stepped tone, or other types of inaudible test signals can be used. The test signal can also have a very low volume such that it is inaudible to a user. Any or all of these audible and inaudible test signals can be used in combination.

These and other embodiments of the present invention can determine the quality of a seal at different times. The times at which these test measurements are made, that is, when these test signals are provided to a user, can vary. For example, test measurements can be performed during an initial set-up of an audio device, for example following a purchase of the audio device. Test measurements can be performed whenever an audio device is removed from a case or otherwise turned on and worn by a user. Test measurements can be done periodically. Test measurements can be performed at the direction of the user. For example, a user can initiate a test by tapping a portion of the audio device. Test measurements can be done more or less often depending on the identity of an application that provides an audio signal to the user. Test measurements can be redone when an application that provides an audio signal to the user is changed. Test measurements can be performed when one of a particular set of settings is changed by the user. Test measurements can be made when the user is in a particularly loud environment. Test measurements can be made when a user significantly changes location or does other action that could likely change the quality of a seal. The type of test signal and the times at which the test signals are provided to a user for seal measurement can be context dependent.

Once these measurements are made, the determination of whether a poor seal or a good seal is present can be made in different ways. For example, when a quality of a seal falls below a threshold, a determination that a seal is poor can be made. The threshold can be set by a user, or it can be a system defined threshold. For example, the threshold can be set to zero such that the user is never informed and never receives an alert. Either or both a user-defined threshold and a system-defined threshold can be context dependent.

A user can be informed of these measurement results, or not informed of measurement results, at various times. For example, when test measurements are being done during an initial set-up of an audio device, for example following a purchase of the audio device, a user would likely want to be informed of the quality of a seal. If a test is done when an audio device is removed from a case or otherwise turned on and worn by a user, a user might want to be informed of the results. When test measurements are done periodically, a user might be unlikely to want to be informed each time. It might be better to inform a user only of test results that have a poor result. When tests are done at the direction of the user, the user would likely want results. Results can be provided more of less often depending on an identity of an application providing an audio signal to the user. When tests are performed following a change in applications that are providing an audio signal to a user, or when one of a particular set of setting is changed by the user, the user might be less likely to want to be informed. A user might want to be informed of a poor seal when the user is in a particularly loud environment.

These notifications can be that a poor seal is present, that a good seal is present, that a poor seal has been improved and is now a good seal, or they can be other notifications. Notifications can be more often sent to a first type of audio device as compared to a second type of audio device based on the likelihood that a user of the first type of audio device is more interested in seal quality. For example, users of on-ear or over-ear headphones can be more likely to receive notifications that users of a pair of earbuds. Notifications can be more often sent to a first type of audio device as compared to a second type of audio device based on the likelihood that a user would be able to improve seal quality. For example, users of on-ear or over-ear headphones can be less likely to receive notifications that users of earbuds. Notifications for each of these devices can inform a user that either or both of a pair of earbuds or either or both of a pair of headphones have a poor seal or a good seal. Notifications can identify which earbud or headphone has a poor seal or a good seal. For example, a notification can inform a user that the right earbud has a poor seal and the left earbud has a good seal. The notification can inform a user that the right earbud has a poor seal. The times at which test results are provided to, or not provided to, a user can be context dependent.

These and other embodiments of the present invention can provide notification of a quality of a seal to a user in different ways. For example, passive alerts, such as pop-up alerts, can be provided on a user's phone that is paired with the audio device. These alerts can inform a user that a seal is of poor quality, or that a seal is of acceptable quality. The alerts can instead be more interactive. For example, suggestions on how to improve the quality can be provided to the user. These suggestions can depend on the type and identity of the audio device. These suggestions can be context dependent.

These and other embodiments of the present invention can inform a user of a drop in seal quality using various devices. For example, an audio device can use one or more associated electronic devices, such as phones, watches, glasses, rings, or other wearable computing devices, tablets, portable or nonportable computing devices, a case for the audio device, and the audio device itself, to communicate with a user. An associated electronic device can be paired or otherwise in secure communication with the audio device, for example using a Bluetooth, Wi-Fi, or wired connection, or it can be paired with or otherwise in secure communication with an electronic device that is paired or otherwise in secure communication with the audio device. Where a phone, watch, tablet, or portable or nonportable computing device is used, current seal quality, seal quality history, audio device identification, and other information can be displayed via a user interface. For example, this information can be provided on a panel that can be displayed on a phone or other device. LEDs or other indicators can be used on a case for the audio device to indicate that seal quality is below a threshold. Other information, such as charging status, can be indicated using the same or different LEDs. Seal quality information can also or instead be audibly provided to a user using the audio device itself.

These and other embodiments of the present invention can make various suggestions to the user when a poor seal is detected. For example, a suggestion to remove and reseat the audio device can be made. A suggestion to replace an ear-tip or cushion can be made. A suggestion to change a size of an ear-tip or cushion can be made. A present size can be tracked or determined by the audio device or associated electronic device and a new size can be suggested based on measurement results and present size. The present size can be determined by input from a user, by reading a bar-code, determining the presence of magnets, by reading a near-field communication tag, or other method. A suggestion to change to a custom ear-tip or cushion can be made.

A suggestion to reposition an ear-tip, cushion, or other portion of an audio device can be made using tactile feedback provided by the audio device. For example, a haptic engine can be used. To avoid the size and power requirements of a haptic engine, other structures in the audio device can be utilized to provide feedback. For example, a pitch or amplitude of an audio signal provided to the user can vary as a function of seal quality. Also or instead, a low-frequency audio signal that replicates vibrations provided by a haptic engine can be provided to a user when seal quality is poor. The low-frequency audio signal can stop when seal quality is sufficiently improved. Alternatively, the low-frequency signal can be provided for a set duration to notify a user of a poor seal. The low-frequency signal can be provided once again following an adjustment that sufficiently improves seal quality.

As shown above, the type of test signals used in measuring the quality of a seal, the times at which a measurement is made, the threshold that determines an acceptable seal, whether the results that are provided to, or not provided to, a user, the manner in which results are provided to a user, the device used to provide results to a user, as well as any suggestions, can all be context dependent. The audio device, either itself or working with an associated electronic device, can determine a present context for a user and then employ appropriate test signals and threshold to determine whether a seal is good or poor. A decision whether to alert the user and how to alert the user, as well as what, if any, suggestions to make can then be made. These decisions can be made in a framework of a list specific contexts, or these decisions can be made in the framework of general types of contexts.

These and other embodiments of the present invention can use a list of specific contexts to provide a framework in which to make these decisions. These specific contexts can include listening to music, listening to news, podcasts, or e-books, phone or internet meetings, exercising, sleeping, in a loud environment, and others. When listening to music, a user might have a heightened interest in ensuring a quality seal. The type of test signal could be inaudible to the user. At these times, testing could be done periodically. Testing could be done when a user significantly changes location or does other action that could change a quality of a seal of an audio device being used. The threshold for determining an acceptable seal could be set fairly high. The threshold can be at least partially determined by a volume at which the music is being played and the type of music being played. Feedback could be provided to a user when a poor seal is detected, while there might be little reason for notifications that a good seal is present. It could be undesirable to provide audible feedback when a user is listening to music. It could also be undesirable to use a haptic engine or other component of the audio device to provide a prompt to the user. Instead, a visual pop-up, panel, or tactile response provided by a haptic engine on an associated electronic device could be preferred. The notifications can further make suggestions to the user, though these can remain limited or can be delayed while the user is listening to music.

Different decisions can be made when a user is listening to non-musical audio, such as news, podcasts, and e-books, or is having a phone or internet call. When listening to such audio, a user might have a lowered but non-zero interest in ensuring a quality seal. The type of test signal could be inaudible to the user. At these times, testing could be done on a less frequent basis. The threshold for determining an acceptable seal could be set to a moderate level. Feedback could be provided to a user when a poor seal is detected, while there might be little reason for notifications that a good seal is present. It could be undesirable to provide audible feedback when a user is listening to such audio. It could be less intrusive to use a haptic engine or other component of the audio device to provide a prompt to the user, at least as compared to when a user is listening to music where no audible feedback might be desirable. A visual pop-up, panel, or tactile response provided by a haptic engine on an associated electronic device could still be preferred. The notifications can further include suggestions to the user.

Different decisions can also be made when a user is exercising. When a user is exercising, they might be changing position or moving such that a quality of a seal might change. Also, since the user is exercising and might be listening to audio as a distraction, the user might have a near zero interest in ensuring a quality seal. The type of test signal could be audible or inaudible to the user. At these times, testing could be done on an infrequent basis. The threshold for determining an acceptable seal could be set to zero or a low level. Feedback of any kind could be undesirable. A visual pop-up, panel, or tactile response provided by a haptic engine on an associated electronic device could still be preferred, though a tactile response provided by a haptic engine or low-frequency audio signal from the audio device could be used. The notifications can inform the user of a poor seal. The notifications can further include suggestions to the user, though they can be delayed until the user is done exercising.

A sleeping user might have a zero interest in ensuring a quality seal. No testing might be performed during these times.

Different decisions can be made when a user is in a loud environment. When in a loud environment, a user might have a heightened interest in ensuring a quality seal. The type of test signal could be inaudible to the user, though an audible test signal might be used in some situations. At these times, testing could be done on a more frequent basis. In such a situation, real-time feedback can be useful to protect a user's hearing. The threshold for determining an acceptable seal could be set to a higher level to help protect the user's hearing. Feedback could be provided to a user when a poor seal is detected, and there might be reason for notifications that a good seal is present. The notifications might be non-audio, for example the notifications could be provided using a haptic engine or other component of the audio device or associated electronic device, though audio notifications could be used in some circumstances, for example when the audio level drops for a period of time. A visual pop-up, panel, or tactile response provided an associated electronic device could still be useful as well. The notifications can inform the user of a poor seal. The notifications can further include suggestions to the user, as well as warnings of the present ambient level.

Notifications in a loud environment can be interactive. For example, a user can be notified of a loud environment and a poor seal quality. A recommendation to improve seal quality can be included, along with suggestions as appropriate. The suggestions can be to "remove and replace," "remove, clean, and replace," and others. Once a good seal is detected, a notification that the seal has been improved can be provided, typically in the same manner that a notification of a poor seal was made. In some circumstances, for example at a concert, a user might be in a loud environment with transparency on. Accordingly, embodiments of the present invention can provide an adjustable level of transparency. A user can be warned that a level of transparency might be too high when in a loud environment. For example, an estimation of the actual sound volume reaching the user can be made based on a reading of the ambient volume and the level of transparency. If the actual sound volume reaching the user could be harmful, the user can be warned to move from the environment or reduce the level of transparency. Alternatively, the level of transparency could be automatically adjusted by the audio device or an associated electronic device.

These and other embodiments of the present invention can use a list of general guidelines to provide a framework in which to make these decisions. These general guidelines can be used in place of specific contexts, or they can be used when a user is not engaged in one of a number of specific contexts. These general guidelines can include the degree to which a user is likely to care about the audio quality actually received. They can further include the likelihood that seal quality will remain stable long enough to be worth improving. The general guidelines can further consider the degree to which a user's hearing can be protected by a good seal.

In some circumstances, it can be determined that a user is likely to be interested in audio quality, though a specific context might not be present. For example, a user's environment might be fairly quiet. A user might be primarily stationary. A user might have already adjusted the audio device multiple times. For situations where a user is likely to be interested in audio quality, testing can be performed more often. The type of test signal could be inaudible to the user. Testing could be done when an app that indicates that a user is likely to be interested in audio quality begins providing an audio signal. Such an app could be a music app or other app. The threshold could be set fairly high to help the user achieve good results. Results can be provided on a pop-up or panel on an associated electronic device, though tactile feedback through the audio device or an associated electronic device could be used. The notifications can inform the user of a poor seal. The notifications can inform the user of a good seal. The notifications can further include suggestions to the user.

In some circumstances, it can be determined that a good seal is unlikely to last, though a specific context might not be present. For example, a user might be accelerating or changing the direction of the audio device at a rapid rate. The user might be in transit. For situations where a good seal is unlikely to last, testing can be reduced or eliminated. The type of test signal could be inaudible to the user. Testing could be done when a user changes the app that is providing an audio signal to the audio device. The threshold could be set low or to zero. Results can be provided on a rare occasion, and the notifications can inform the user of a poor seal. The notifications can further include suggestions to the user.

In some circumstances, it can be determined that a good seal would likely protect a user's hearing, though a specific context might not be present. For example, a user might be in a location where loud noises, either sudden or sustained, have been previously encountered. For situations where a good seal is likely to protect a user's hearing, a user might have a heightened interest in ensuring a quality seal. The type of test signal could be inaudible to the user, though an audible test signal might be used in some situations. At these times, testing could be done on a more frequent basis. In such a situation, real-time feedback can be useful in order to protect a user's hearing. The threshold for determining an acceptable seal could be set to a higher level to help protect the user's hearing. Feedback could be provided to a user when a poor seal is detected, and there might be reason for notifications that a good seal is present. The notifications might be non-audio, for example the notifications could be provided using a haptic engine or other component of the audio device or associated electronic device. A visual pop-up, panel, or tactile response provided an associated electronic device could still be useful as well. The notifications can inform the user of a poor seal. The notifications can further include suggestions to the user, as well as warnings of the present ambient level.

Notifications made when a good seal would likely protect a user's hearing can be interactive. For example, a user can be notified of a risk to a user's hearing and a poor seal quality. A recommendation to improve seal quality can be included, along with suggestions as appropriate. The suggestions can be to "remove and replace," "remove, clean, and replace," and others. Once a good seal is detected, a notification that the seal has been improved can be provided, typically in the same manner that a notification of a poor seal was made. In some circumstances, a user might be in high-risk environment with transparency on. Accordingly, embodiments of the present invention can provide an adjustable level of transparency. A user can be warned that a level of transparency might be too high when such an environment. For example, an estimation of the actual sound volume reaching the user can be made based on a reading of the ambient volume and the level of transparency. When in a high-risk environment, the user can be warned to move from the environment or reduce the level of transparency. Alternatively, the level of transparency could be automatically adjusted by the audio device or an associated electronic device.

In some circumstances, no specific context might be applicable, and no information that would indicate which general guideline to use might be present. In such a case, a default set of guidelines can be used. In these and other embodiments of the present invention, the default set of guidelines can be used when a specific context is not present, or they can be used at all times. The default guidelines can provide for a test signal that is inaudible to the user. At these times, testing could be done on a periodic basis. The threshold for determining an acceptable seal could be set to a moderate level. Feedback could be provided to a user when a poor seal is detected. Notifications that a good seal is present might be useful when the audio device is removed from a case. Feedback could be audible, or feedback can be provided using a haptic engine or other component of the audio device to provide a prompt to the user. The notifications can further include suggestions to the user.

The suggestions provided to help a user improve a quality of a seal, and the method by which they are provided, can be context dependent as well. For example, suggestions such as remove and replace audio device or remove, clean, and replace audio device, can be made with each notification of a poor fit. These can be provided using audible signals from the audio device, they can appear as pop-ups or panels on an associated electronic device, or they can be provided in other ways. Suggestions to change a size of an ear-tip, cushion, or other portion of an audio device can be made when the audio device is used for the first time. Suggestions following an initial usage can likely be provided using audible signals from the audio device, though they can appear as pop-ups or panels on an associated electronic device, or they can be provided in other ways.

The suggestions provided to help a user improve a quality of a seal can be improved by tracking seal quality over time. This data can be stored solely on a user's device, such as a phone, or on the audio device itself. As an example, a suggestion to replace an ear-tip can be made when seal quality is tracked over time. That is, as an ear-tip, cushion, or other portion of an audio device ages, a degradation of seal quality over time can be tracked. At a certain time, it can become advantageous for the ear-tip, cushion, or other portion to be replaced, and the user can be notified accordingly. Since degradation can be tracked, it can be desirable for some users to employ an ear-tip, cushion, or other portion formed of a material that provides a better audio quality even if it is not as durable. Appropriate suggestions such as custom molding or other alternatives can be suggested to the user. This can be true when foam or other materials are used. Since a user can be alerted to replace the ear-tip, cushion, or other portion, durability might not be paramount for some users.

Tracking seal quality over time can also provide information leading to a suggestion to try a different sized ear-tip. That is, a consistently poor seal can be indicative of a wrong sized ear-tip, cushion, or other portion of an audio device. Accordingly, a user can be notified that a different size would improve performance and can be directed as how to receive or procure one. To help facilitate this, the audio device or associated electronic device can store a present size of the ear-tip, cushion, or other portion. The present size can be stored during an initial setup, where a user is asked what size ear-tip, cushion, or other portion is being used. The present size can be read and stored by the audio device reading a bar code or other information on the ear-tip, cushion, or other portion. When the present size is known, different sizes can be suggested based on seal quality. In these and other embodiments of the present invention, an audio device or associated electronic device can determine that a custom ear-tip, cushion, or other portion might be necessary for a desired quality of seal. Appropriate suggestions such as custom molding or other alternatives can be suggested to the user.

The ability to provide suggestions can further be used to help to conserve resources. For example, a median-sized ear-tip, cushion, or other portion of an audio device can be included with the audio device. If this median sized portion is not adequate, the user can be directed as how to receive or procure a more appropriate size. This can reduce an amount of waste that can otherwise be generated by providing multiple sized ear-tips, cushions, or other portions with each audio device.

Again, the fit of an ear-tip, cushion, or other portion of an audio device can be determined and used as a proxy for seal quality. For example, a temperature sensor in or near an ear-tip, cushion, or other portion of an audio device can be used to determine how well the ear-tip, cushion, or other portion fits in a user's ear canal. If a temperature near an expected body temperature is reached, a determination that a good fit is present can be made. If a temperature below an expected body temperature is reached, a determination that a poor fit is present can be made. This determination of a good fit can be used to determine that a good quality seal is present. A drop in temperature can indicate that fit and therefor seal quality is similarly reduced.

These and other embodiments of the present invention can provide various health benefits. For example, seal quality and body temperature can be measured independently, and body temperature can be tracked to help determine the onset of illness. This data can be stored solely on a user's device, such as a phone, or on the audio device itself. A poor seal can be used to determine that temperature measurements might not be accurate, and a user can be notified accordingly. The seal test results can also be stored with the temperature data as an indication of reliability, or temperature data corresponding to poor seal test results can be disregarded. The seal tests can be performed before and after the temperature measurements in order to help validate the accuracy of the temperature data. Since several validation tests might be necessary, the test signals used can be inaudible to the user.

Again, embodiments of the present invention can be particularly useful in protecting hearing in a loud environment. Once a good seal has been made, embodiments of the present invention can further provide noise cancellation to block undesired sounds. When it is desirable to listen to a loud audible source, such as at a concert, embodiments of the present invention can provide transparency and can limit the volume of the audio signal that reaches a user's ear canal. Equalization can be used to improve the quality of the audio signal heard by a user. Equalization can be used to help compensate for remaining imperfections in the seal of the audio device. The loudness and the seal quality can be tracked and the data can be stored solely on a user's device, such as a phone, or on the audio device itself. Some or all of this loudness and seal data, as well as temperature data, usage data, and other types of data, can be used in providing aggregate assessments of hearing health to users.

The activities involved in providing a notification regarding a seal can be allocated among devices in various ways. For example, a determination of when to test seal quality can be made by an associated electronic device, such as a phone that is paired with the audio device, though the audio device can make this determination in some embodiments of the present invention. The type of test signal to use can be determined by the associated electronic device, and instructions can be provided to the audio device. The audio device can instead receive an instruction from the associated electronic device to send a test signal and the audio device can determine the test signal to send. The audio device can compare an amount of leakage to a threshold, determine a quality of a seal, and provide the results to either the user or an associated electronic device. The audio device can instead provide an indication of an amount of leakage to the associated electronic device, and the associated electronic device can then determine the quality of the seal. The determination of whether to provide test results can be done by either the audio device or an associated electronic device. The manner in which test results are provided, and the actual test results, can be provided by either the audio device or an associated electronic device. Suggested solutions can be provided by an associated electronic device, the audio device, or by another device. Relevant data and other information can be shared among the audio device and one or more associated electronic devices using commands, flags, data, or other types of signals.

The notifications provided to a user can be interactive. For example, a notification can inform the user of a poor seal. The notification can provide an option to stop further interaction, or it can provide an option for further information. The further information can include suggestions on how to improve the seal, such as "remove and replace," "remove, clean, and replace," or others. The further information can include suggestions for replacements or alternative solutions. After the audio device has been removed and replaced, a further notification informing the user as to whether the seal is good or the seal is poor can be made.

The quality of an acoustic seal can be key to the performance of advanced features such as active noise cancellation, transparency, adaptive transparency, hearing protection, hearing assessment technologies, hearing augmentation and others, primarily due to the requirement of passive attenuation at higher frequencies where active feedback loops cannot effectively function. The quality of a seal can be variable especially as users move, sweat, touch the device for UI controls, and exercise. Providing information regarding the seal actively in a phone user interface, watch user interface, or even via spoken feedback on the audio devices can provide user feedback to allow the user to adjust for the best performance. Further steps, such as resizing or replacing a tip can be taken if poor seal quality is a consistent issue. That is, resizing or replacing the tip can be a recommendation the user interface provides when seal issues are frequently detected.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 4 illustrates several specific contexts and corresponding guidelines that can form part of a framework for making decisions for providing a notification regarding a quality of a seal formed using an audio device according to an embodiment of the present invention;

FIG. 5 illustrates several general contexts and corresponding guidelines that can form part of a framework for making decisions for providing a notification regarding a quality of a seal formed using an audio device according to an embodiment of the present invention;

FIG. 6 illustrates a default context and corresponding guidelines that can form part of a framework for making decisions for providing a notification regarding a quality of a seal formed using an audio device according to an embodiment of the present invention;

DESCRIPTION OF EXEMPLARY EMBODIMENTS

Figure 1B:
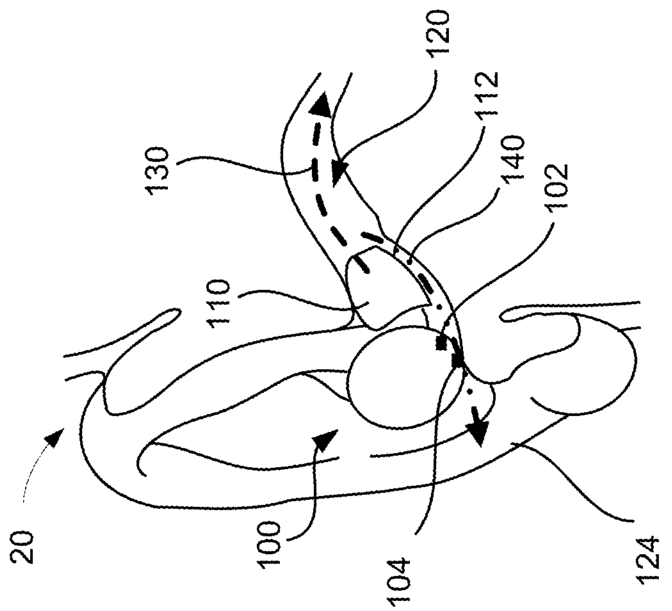
FIGS. 1A and 1B are cross-sectional illustrations of an audio device forming a seal in accordance with an embodiment of the present invention.

Illustrative embodiments of the present invention can provide circuits, methods, and apparatus that can determine a quality of a seal formed using an audio device, can inform a user of the quality of the seal, and can help the user to improve the quality of the seal. An illustrative embodiment of the present invention can improve a user's experience when using an audio device. For example, a poor seal between an earbud and a user's ear canal can degrade an audio signal provided by the earbud to the user. Similarly, a poor seal between a side of a user's head and over-the-ear headphones, or a poor seal between a user's ear and on-ear headphones, can degrade an audio signal heard by the user. A poor audio seal in any of these situations can degrade a user's experience. By determining that a seal is low-quality and notifying the user, the user can take steps to improve the audio seal. As a result, the audio signal received by the user can be improved. Embodiments of the present invention can be useful when listening to music. They can also be useful by reducing frustration and miscommunication during meetings conducted over the internet or phone.

Embodiments of the present invention can also be useful when an audio device operates in a transparency mode. While in a transparency mode, ambient audio can be provided to a user along with or in place of other audio content, such a music. The ambient audio can be received by a microphone on an outside of a user's head and passed to the user. The ambient audio can be provided to the user at a signal level or volume that closely matches the level of ambient audio, the ambient audio can be amplified and provided to the user, or the ambient audio can be attenuated and provided the user. A level of transparency can be adjusted throughout this range by the user, the audio device, or an associated electronic device. A poor seal can degrade the audio signal being provided to the user making it more difficult to hear their surroundings. Embodiments of the present invention can help a user to improve the seal to improve the sound replication of the ambient audio provided to the user. This can improve a user's ability to hold a conversation while wearing headphones or earbuds. This can also improve a user's ability to be aware of present conditions in their immediate environment.

Embodiments of the present invention can also help protect a user's hearing. Earbuds or headphones can be worn where a user might be exposed to loud sounds. Where a poor seal is made, the attenuation that could otherwise be provided by the audio device can be reduced. This can put a user at a risk of long-term hearing loss or damage. Embodiments of the present invention can alert and help a user to improve the seal for better hearing protection.

Embodiments of the present invention can also help protect a user's hearing when operating in a transparency mode. For example, the amount of ambient audio provided to the user can be varied depending on its volume. Where ambient volume is excessive, the ambient audio can be attenuated. Where a sudden noise occurs, the amount of attenuation can be quickly increased for further protection.

Power stored in the audio devices can be wasted when a poor seal is present. For example, an amplification might need to be increased to compensate for a poor seal. Other functions of the audio devices, such as noise cancellation, might try to compensate for a poor seal. Accordingly, by helping a user improve the quality of a seal formed by an audio device, embodiments of the present invention can reduce power consumption.

Figure 1A:
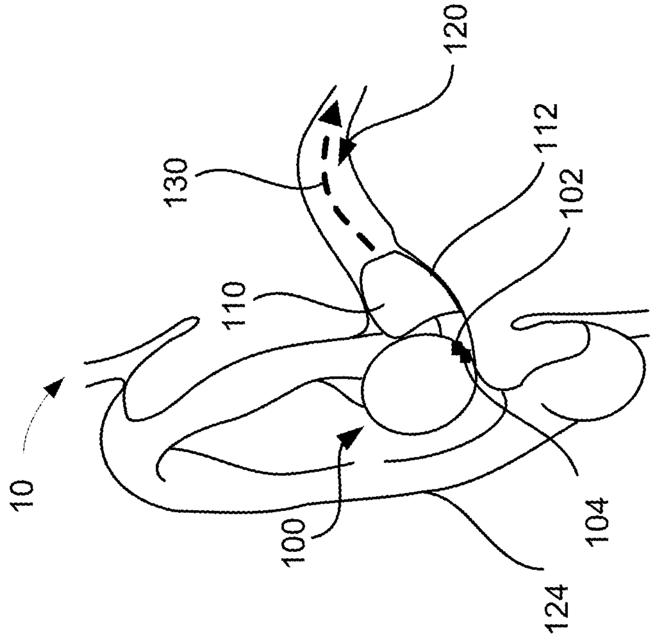

FIGS. 1A and 1B are cross-sectional illustrations of an audio device forming a seal in accordance with an embodiment of the present invention. Specifically, FIG. 1A is a cross-sectional view illustration 10 of audio device 100 when a quality of a seal is high and leakage is not present or is limited, while FIG. 1B is a cross-sectional illustration 20 of audio device 100 when a seal is of low quality and leakage 140 is present.

In FIG. 1A, audio device 100 forms a seal with a user's ear canal 120. The audio device 100 can be an in-ear audio device 100 and can include an ear-tip 110. Ear-tip 110 can be pliable and can form a seal along perimeter 112 of ear-tip 110 with ear canal 120. When properly inserted, audio device 100 can provide audio or test signals 130 along ear canal 120 with a low amount of leakage. That is, the seal formed along perimeter 112 of ear-tip 110 can be of good quality and leakage can be low. Audio device 100 can include other components, such as a detect microphone 102 and a temperature sensor 104. In these and other embodiments of the present invention, additional components, such as other microphones, speakers, sensors, temperature sensors, and others can be included and are not shown here for simplicity.

In FIG. 1B, a seal formed along perimeter 112 of ear-tip 110 of audio device 100 can be of a low quality and leakage 140 can be present. That is, a portion of an audio or test signal 130 can be reflected back as leakage 140 between ear-tip 110 and ear canal 120. This leakage can be detected by detect microphone 102, which can be internally facing to receive leakage 140.

Audio device 100 can generate a test signal 130 into ear canal 120, and internally facing detect microphone 102 can be activated to receive sound from outside of the seal along perimeter 112. When a high quality or complete seal is made with ear canal 120 as shown in FIG. 1A, internally facing detect microphone 102 might not detect leakage 140 from test signal 130. As shown in FIG. 1B, when leakage is present and a poor, low quality, or leaky seal is made along perimeter 112 of ear-tip 110 with ear canal 120, internally facing detect microphone 102 may detect test signal 130 as leakage 140 and can determine whether the detected sound is caused by a leak in the seal. That is, audio device 100 can be configured to measure the decibel level of sound resonating within ear canal 120 induced by test signal 130 and compare that measured decibel level to an expected decibel level. If the measured decibel level is greater than a threshold, then audio device 100 can determine that a poor-quality seal exists. Having a proper seal can improve attenuation of outside noise, enabling the operation of active noise cancellation to use less power. Furthermore, having a proper seal can imply that ear-tip 110 has a solid contact with ear canal 120, which can result in improved in-ear stability.

In this example, audio device 100 is shown as an in-ear audio device 100 having an ear-tip 110. Audio device 100 can be other types of devices in these and other embodiments of the present invention. For example, audio device 100 can be an in-ear audio device 100 that does not include an ear-tip 110 where a seal is formed between a body of the in-ear device and a user's ear canal 120. Audio device 100 can be over-the-ear headphones where a seal is formed between a cushion of the headphones and the region surrounding a user's ear 124. Audio device 100 can be on-the-ear headphones where a seal is formed between a cushion of the headphones and the user's ear 124.

A determination of a quality of a seal can be made in different ways consistent with embodiments of the present invention. For example, audio device 100 can provide test signal 130 to ear canal 120 using a speaker (not shown.) Changes in pressure near a surface of the speaker can be monitored, for example by using a barometer (not shown.) For example, when an in-ear audio device 100 is in ear canal 120, changes in pressure in ear canal 120 be measured. Small changes in pressure can indicate leakage 140 between the ear-tip 110 and ear canal 120, indicating a poor fit, while more substantial changes can indicate a better or good fit. Similarly, when a cushion of headphones (not shown) are on or around a user's ear 124, changes in the volume bounded by the headphones can be monitored during a test signal. Again, small changes in pressure can indicate leakage 140 between the cushions and user's ear 124, indicating a poor fit, while more substantial changes can indicate a better or good fit.

Measurements to determine fit can also be made by monitoring an impedance of a speaker of audio device 100. For example, an impedance of a speaker of audio device 100 as it provides a test signal to a sealed area described above can be measured. When a poor seal is present, the resistance to movement of the speaker due to air pressure can be reduced, thereby reducing the speaker impedance. Conversely, when a good seal is present, the resistance to movement of the speaker due to air pressure can be increased, thereby increasing the speaker impedance. A low speaker impedance can indicate a poor seal, while a higher speaker impedance can indicate a better or good fit.

Measurements to determine fit can also be made by taking a user's temperature. For example, audio device 100 can include temperature sensor 104. Temperature sensor 104 can measure a temperature at a location at a surface of audio device 100 that would be expected to be in contact with the user. A measured temperature within an expected range can then be used as a proxy for a good fit. A measured temperature below an expected range can indicate a poor fit. This is described further in FIG. 8 below.

There can be many factors taken into account in determining whether, and how, to test the quality of a seal formed by audio device 100. Before a test is performed, a determination can be made that a user is wearing the audio device. For example, the seal quality determination can be made after is has been determined that a user has inserted an ear-tip of an earbud into an ear canal, or after a determination has been made that the user is wearing an over-the-ear headphone, an on-the-ear headphone, or other in-ear headphone. Once the seal quality test has been performed, other factors can be accounted for in determining whether, and how, to inform a user as to the quality of the seal. Some of these factors are described in the following figure.

Figure 2:
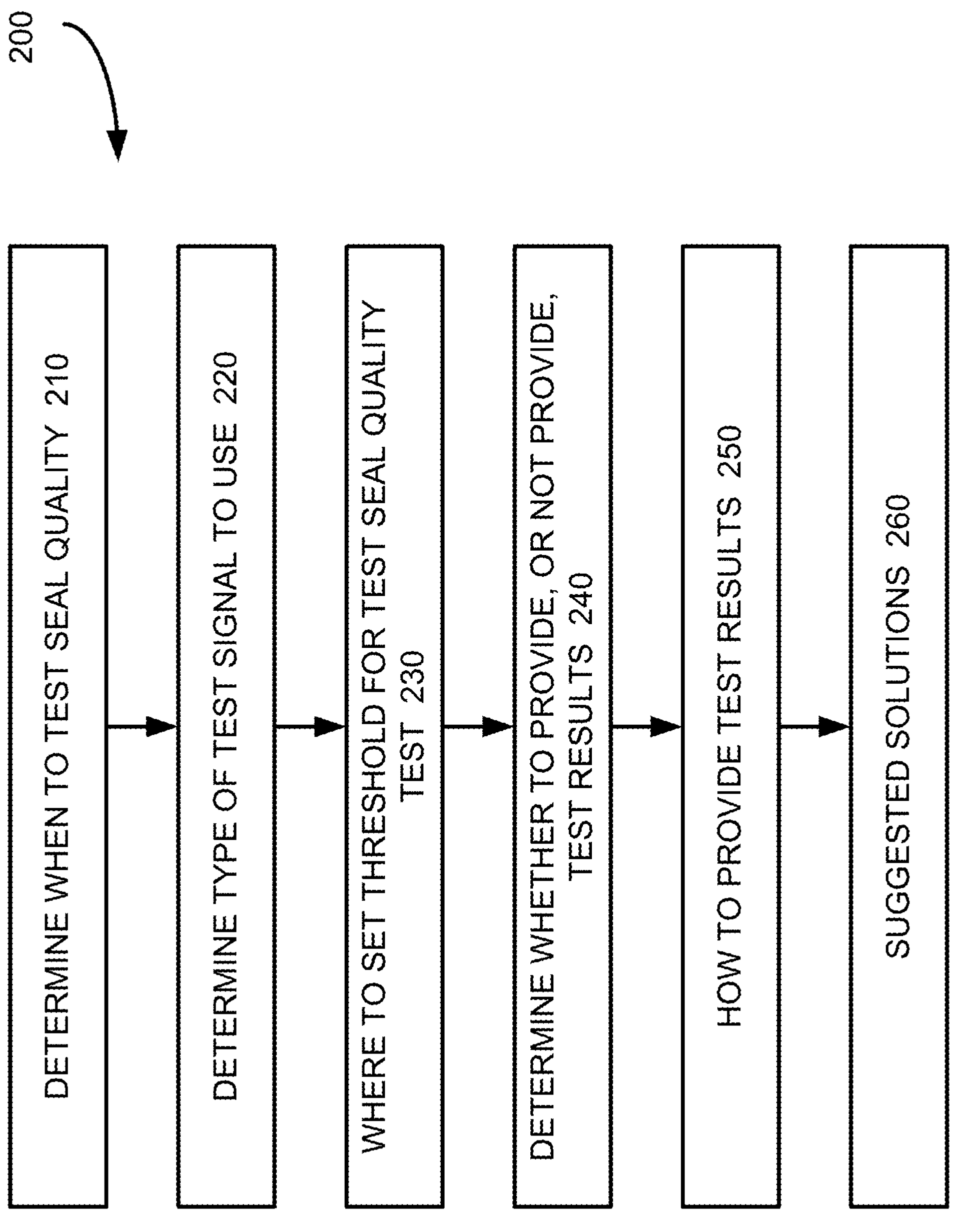
FIG. 2 illustrates decisions that can be made while providing a notification regarding a quality of a seal formed using an audio device according to an embodiment of the present invention.

FIG. 2 illustrates decisions that can be made while providing a notification regarding a quality of a seal formed using an audio device. In act 210, a determination of when to test seal quality can be made. The times at which these test measurements are made, that is, when these test signals 130 (shown in FIG. 1) are provided to an ear canal 120 (shown in FIG. 1), can vary. For example, test measurements can be performed during an initial set-up of audio device 100 (shown in FIG. 1), for example following a purchase of audio device 100. Test measurements can be performed whenever audio device 100 is removed from a case or otherwise turned on and worn by a user. Test measurements can be done periodically. Test measurements can be performed at the direction of the user. Tests can be initiated by a user tapping a portion of audio device 100, for example by tapping stem 902 (shown in FIG. 9A) of audio device 100. Test measurements can be done more or less often depending on the identity of an application that provides an audio signal to the user. Test measurements can be redone when an application that provides an audio signal to the user is changed. Test measurements can be performed when one of a particular set of setting is changed by the user. Test measurements can be made when the user is in a particularly loud environment. Test measurements can be made when a user significantly changes location or does other action that could likely change the quality of a seal. The times at which the test signals are provided to a user for seal measurement can be context dependent.

In act 220, a type of test signal 130 to be used can be determined. In these and other embodiments of the present invention, different types of test signals 130 can be provided by audio device 100. For example, an audible signal, such as music, notes, white noise, a signal having a ramping tone, a stepped tone, or other types of audible test signals 130 can be provided. Audible test signals 130 can be particularly useful during an interactive session where a correct size of a portion of audio device 100 is being determined. A test signal 130 can also be inaudible. For example, inaudible tones having a frequency twice above the typical hearing range or approximately 44 kHz can be used, as can inaudible tones below the typical hearing range of approximately 20 Hz. An inaudible test signal 130 having a ramping tone, a stepped tone, or other types of inaudible test signals 130 can be used. The test signal 130 can also have a very low volume such that it is inaudible to a user. Any or all of these audible and inaudible test signals 130 can be used in combination. The type of test signal 130 used can be context dependent.

In act 230, the determination of whether a poor seal or a good seal is present can be made. For example, when a quality of a seal falls below a threshold, a determination that a seal is poor can be made. The threshold can be set by a user, or it can be a system defined threshold. For example, the threshold can be set to zero such that the user is never informed and never receives an alert. The threshold can be set to a high level such that a good seal is ensured. Either or both a user-defined threshold and a system-defined threshold can be context dependent.

In act 240, a user can be informed of these measurement results, or not informed of measurement results, at various times. For example, when test measurements are being done during an initial set-up of audio device 100, for example following a purchase of audio device 100, a user would likely want to be informed of the quality of a seal. If a test is done when audio device 100 is removed from a case or otherwise turned on and worn by a user, a user might want to be informed of the results. When test measurements are done periodically, a user might be unlikely to want to be informed each time. It might be better to inform a user only of test results that have a poor result. When tests are done at the direction of the user, the user would likely want results. Results can be provided more of less often depending on an identity of an application providing an audio signal to the user. When tests are performed following a change in applications that are providing an audio signal to a user, or when one of a particular set of setting is changed by the user, the user might be less likely to want to be informed. A user might want to be informed of a poor seal when the user is in a particularly loud environment.

Notification of test results can include a message that the seal quality is poor. Notification of test results can include a message that the seal quality is good. Notification of test results can include a message that the seal quality was poor but is now good. Notification of test results can include other messages regarding seal quality. Notifications can be more often sent to a first type of audio device as compared to a second type of audio device based on the likelihood that a user of the first type of audio device is more interested in seal quality. For example, users of on-ear or over-ear headphones can be more likely to receive notifications that users of in-ear audio device 100. Notifications can be more often sent to a first type of audio device as compared to a second type of audio device based on the likelihood that a user would be able to improve seal quality. For example, users of on-ear or over-ear headphones can be less likely to receive notifications that users of in-ear audio device 100. Notifications for each of these devices can inform a user that either or both of a pair of in-ear audio devices 100 or either or both of a pair of headphones have a poor seal or a good seal. Notifications can identify which in-ear audio device 100 or headphone has a poor seal or a good seal. For example, a notification can inform a user that the right in-ear audio device 100 has a poor seal and the left in-ear audio device 100 has a good seal. The notification can inform a user that the right in-ear audio device 100 has a poor seal. The times at which test results are provided to, or not provided to, a user can be context dependent.

In act 250, a notification of a quality of a seal can be provided to the user. For example, passive alerts, such as pop-up alerts, can be provided on a user's phone (not shown) that is paired with audio device 100. These alerts can inform a user that a seal is of poor quality, or that a seal is of acceptable quality. The alerts can instead be more interactive. For example, in act 260, suggestions on how to improve the quality can be provided to the user. These suggestions can depend on the type and identity of audio device 100. These suggestions can be context dependent.

Also in act 250, a user can be informed of a poor seal quality using various devices. For example, audio device 100 can use one or more associated electronic devices, such as phones, watches, glasses, rings, or other wearable computing devices, tablets, portable or nonportable computing devices, a case for audio device 100, and audio device 100 itself (not shown), to communicate with a user. An associated electronic device can be paired or otherwise in secure communication with audio device 100, for example using a Bluetooth, Wi-Fi, or wired connection, or it can be paired with or otherwise in secure communication with an electronic device that is paired or otherwise in secure communication with audio device 100. Where a phone, watch, tablet, or portable or nonportable computing device is used, current seal quality, seal quality history, audio device identification, and other information can be displayed via a user interface. For example, this information can be provided on a panel that can be displayed on a phone or other device. LEDs or other indicators can be used on a case for audio device 100 to indicate that seal quality is below a threshold. Other information, such as charging status, can be indicated using the same or different LEDs. Seal quality information can also or instead be audibly provided to a user using audio device 100 itself.

Again, in act 260, various suggestions can be made to the user when a poor seal is detected. These suggestions can be made along with a notification of a status of a seal, or they can be separate from notifications of the status of the seal. For example, a suggestion to remove and reseat audio device 100 can be made. A suggestion to replace an ear-tip 110 (shown in FIG. 1) or cushion can be made. A suggestion to change a size of an ear-tip 110 or cushion can be made. A present size can be tracked or determined by audio device 100 or associated electronic device and a new size can be suggested based on measurement results and present size. This determination can be made by input from a user, by reading a bar-code, determining the presence of magnets, by reading a near-field communication tag, or other method. A suggestion to change to a custom ear-tip 110 or cushion can be made.

A suggestion to reposition ear-tip 110, cushion, or other portion of audio device 100 can be made using tactile feedback provided by audio device 100. For example, a haptic engine (not shown) can be used. To avoid the size and power requirements of a haptic engine, other structures in audio device 100 can be utilized to provide feedback. For example, a pitch or amplitude of an audio signal provided to the user can vary as a function of seal quality. Also or instead, a low-frequency audio signal that replicates vibrations provided by a haptic engine can be provided to a user when seal quality is poor. The low-frequency audio signal can stop when seal quality is sufficiently improved. Alternatively, the low-frequency signal can be provided for a set duration to notify a user of a poor seal. The low-frequency signal can be provided once again following an adjustment that sufficiently improves seal quality.

As shown above, the type of test signals used in measuring the quality of a seal, the times at which a measurement is made, the threshold that determines an acceptable seal, whether the results that are provided to, or not provided to, a user, the manner in which results are provided to a user, the device used to provide results to a user, as well as any suggestions, can all be context dependent. Audio device 100, either itself or working with an associated electronic device, can determine a present context for a user and then employ appropriate test signals 130 and threshold to determine whether a seal is good or poor. A decision whether to alert the user and how to alert the user, as well as what, if any, suggestions to make can then be made. These decisions can be made in a framework of a list specific contexts, these decisions can be made in the framework of general types of contexts, or these decisions can be made in the framework of a default context. A flowchart illustrating this is shown in the following figure.

Figure 3:
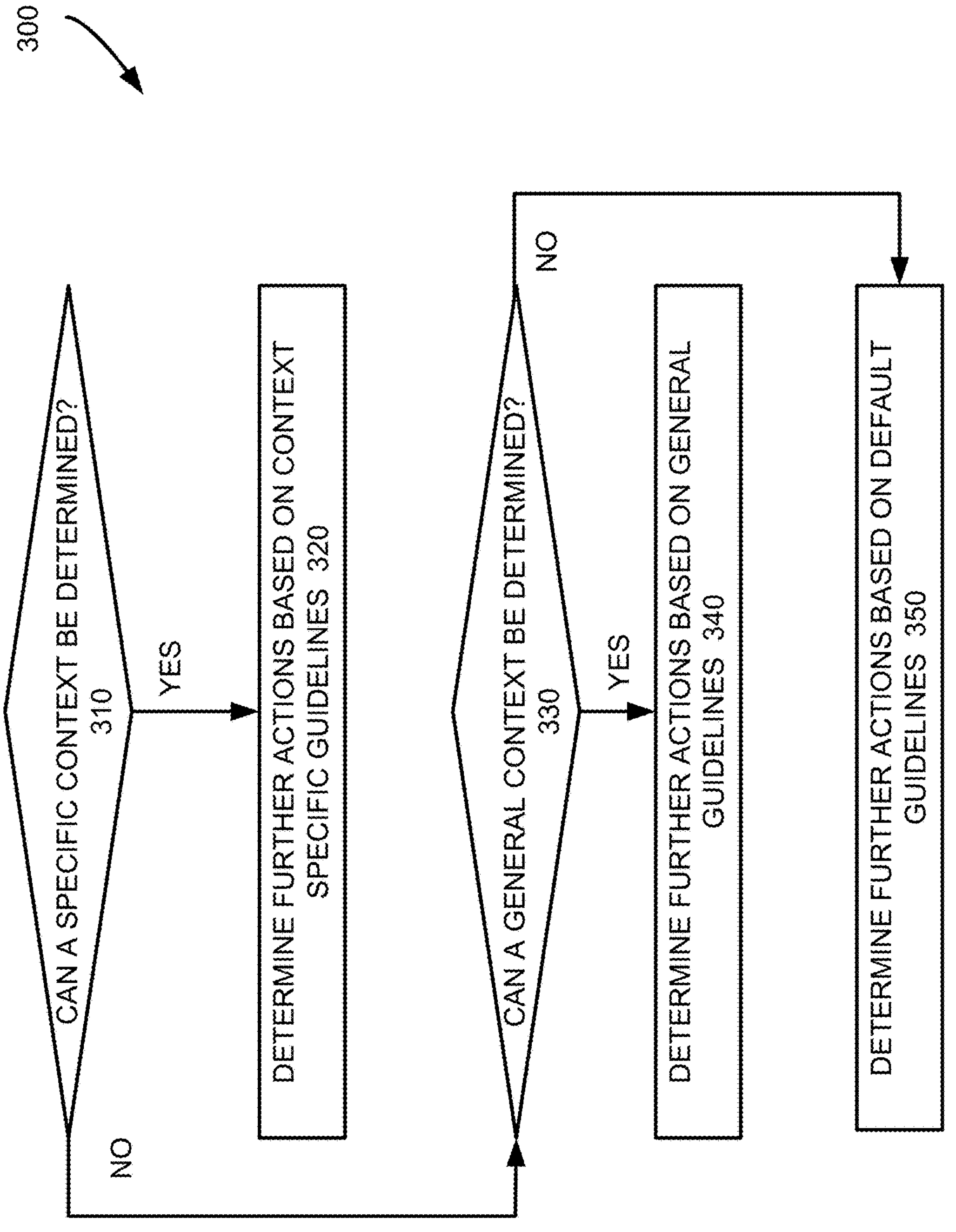
FIG. 3 illustrates a framework for making decisions for providing a notification regarding a quality of a seal formed using an audio device according to an embodiment of the present invention.

FIG. 3 illustrates a framework for making decisions for providing a notification regarding a quality of a seal formed using an audio device according to an embodiment of the present invention. In act 310, it can be determined whether audio device 100 (shown in FIG. 1) is operating in one of a number of specific contexts. If audio device 100 is operating in one of these specific contexts, then further actions can be based on context specific guidelines in act 320. The specific contexts can be a particular activity, such as exercising or listening to music. An example of specific contexts and their guidelines is shown in FIG. 4 below.

If none of the specific contexts are applicable, then in act 330 it can be determined whether audio device 100 is operating in one of a number of general contexts. If audio device 100 is operating in one of these general contexts in act 330, then further actions can be based on general guidelines in act 340. The general contexts can activities that involve a certain feature or characteristic, such as a low likelihood that a seal will remain stable. An example of general contexts and their guidelines is shown in FIG. 5 below.

If none of the general contexts are applicable, then in act 350, further actions can be based on a set of default guidelines. An example of these default guidelines is shown in FIG. 6 below.

FIG. 4 illustrates several specific contexts and corresponding guidelines that can form part of a framework for making decisions for providing a notification regarding a quality of a seal formed using an audio device according to an embodiment of the present invention. These and other embodiments of the present invention can use a list of specific contexts to provide a framework in which to make the decisions outlined in FIG. 2. Each specific context can be a particular activity that a user can be engaged in with audio device 100 (shown in FIG. 1.) In this example, table 400 provides a list of specific contexts that includes listening to music, listening to news, podcasts, or e-books, phone or internet meetings, exercising, sleeping, and being in a loud environment.

As shown in column 410, when listening to music, a user might have a heightened interest in ensuring a quality seal. The determination that a user is listening to music can typically be performed by an associated electronic device, though this determination can be performed by audio device 100 or by a combination of an associated electronic device and audio device 100. At these times, testing could be done periodically. The type of test signal could be inaudible to the user. Testing could be done when a user significantly changes location or does other action that could change a quality of a seal of audio device 100 being used. The threshold for determining an acceptable seal could be set fairly high. The threshold can be at least partially determined by a volume at which the music is being played and the type of music being played. Feedback could be provided to a user when a poor seal is detected, while there might be little reason for notifications that a good seal is present. It could be undesirable to provide audible feedback when a user is listening to music. It could also be undesirable to use a haptic engine or other component of audio device 100 to provide a prompt to the user. Instead, a visual pop-up, panel, or tactile response provided by a haptic engine on an associated electronic device could be preferred. The notifications can further make suggestions to the user, though these can remain limited or can be delayed while the user is listening to music.

As shown in column 420 and column 430, different decisions can be made when a user is listening to non-musical audio, such as news, podcasts, and e-books, or having a phone or internet call. The determination that a user is listening to non-musical audio can typically be performed by an associated electronic device, though this determination can be performed by audio device 100 or by a combination of an associated electronic device and audio device 100. When listening to such audio, a user might have a lowered but non-zero interest in ensuring a quality seal. At these times, testing could be done on a less frequent basis. The type of test signal could be inaudible to the user. The threshold for determining an acceptable seal could be set to a moderate level. Feedback could be provided to a user when a poor seal is detected, while there might be little reason for notifications that a good seal is present. It could be undesirable to provide audible feedback when a user is listening to such audio. It could be less intrusive to use a haptic engine or other component of audio device 100 to provide a prompt to the user, at least as compared to when a user is listening to music where no audible feedback might be desirable. A visual pop-up, panel, or tactile response provided by a haptic engine on an associated electronic device could still be preferred. The notifications can further include suggestions to the user.

Different decisions can also be made when a user is exercising, as shown in column 440. The determination that a user is exercising can typically be performed audio device 100, for example using an accelerometer in audio device 100, though this determination can be performed by an associated electronic device, for example by determining that the user is in a gym, or by a combination of an associated electronic device and audio device 100. Information regarding this determination can be received from audio device 100 by an associated electronic device. When a user is exercising, they might be changing position or moving such that a quality of a seal might change. Also, since the user is exercising and might be listening to audio as a distraction, the user might have a near zero interest in ensuring a quality seal. At these times, testing could be done on an infrequent basis. The type of test signal could be audible or inaudible to the user. The threshold for determining an acceptable seal could be set to zero or a very low level. Feedback of any kind could be undesirable. A visual pop-up, panel, or tactile response provided by a haptic engine on an associated electronic device could still be preferred, though a tactile response provided by a haptic engine or low-frequency audio signal from audio device 100 could be used. The notifications can inform the user of a poor seal. The notifications can further include suggestions to the user, though can be delayed until the user is done exercising.

As shown in column 450, a sleeping user might have a zero interest in ensuring a quality seal. No testing might be performed during these times. A determination that a user is sleeping can be made from lack a movement of the user during a range of time during the day. This determination can typically be performed audio device 100, for example using an accelerometer in audio device 100, though this determination can be performed by an associated electronic device, for example by determining that the user is in a location where they usually sleep or by the time of day, or by a combination of an associated electronic device and audio device 100. Information regarding this determination can be received from audio device 100 by an associated electronic device.

Different decisions can be made when a user is in a loud environment, as shown in column 460. The determination that a user is in a loud environment can be made by audio device 100 or an associated electronic device, such as a watch or other wearable computing device. When in a loud environment, a user might have a heightened interest in ensuring a quality seal. The type of test signal could be inaudible to the user, though an audible test signal might be used in some situations. At these times, testing could be done on a more frequent basis. In such a situation, real-time feedback can be useful to protect a user's hearing. The threshold for determining an acceptable seal could be set to a higher level to help protect the user's hearing. Feedback could be provided to a user when a poor seal is detected, and there might be reason for notifications that a good seal is present. The notifications might be non-audio, for example the notifications could be provided using a haptic engine or other component of audio device 100 or associated electronic device. A visual pop-up, panel, or tactile response provided an associated electronic device could still be useful as well. The notifications can inform the user of a poor seal. The notifications can inform the user of a good seal. The notifications can further include suggestions to the user, as well as warnings of the present ambient level.

Notifications in a loud environment can be interactive. For example, a user can be notified of a loud environment and a poor seal quality. A recommendation to improve seal quality can be included, along with suggestions as appropriate. The suggestions can be to "remove and replace," "remove, clean, and replace," and others. Once a good seal is detected, a notification that the seal has been improved can be provided, typically in the same manner that a notification of a poor seal was made. In some circumstances, for example at a concert, a user might be in a loud environment with transparency on. Accordingly, embodiments of the present invention can provide an adjustable level of transparency. A user can be warned that a level of transparency might be too high when in a loud environment. For example, an estimation of the actual sound volume reaching the user can be made based on a reading of the ambient volume and the level of transparency. If the actual sound volume received by the user could be harmful, the user can be warned to move from the environment or reduce the level of transparency. Alternatively, the level of transparency could be automatically adjusted by audio device 100 or an associated electronic device.

A user might not always be engaged in one of these specific contexts with audio device 100, or the specific context might not be determinable. In these circumstances, a general guideline can be used. An example of general contexts and their corresponding guidelines are shown in the following figure.

FIG. 5 illustrates several general contexts and corresponding guidelines that can form part of a framework for making decisions for providing a notification regarding a quality of a seal formed using an audio device according to an embodiment of the present invention. As shown in table 500, these and other embodiments of the present invention can use a list of general guidelines to provide a framework in which to make these decisions. These general guidelines can be used in place of specific contexts, or they can be used when a user is not engaged in one of a number of specific contexts. As shown in table 500, general guidelines can include the degree to which a user is likely to care about the audio quality actually received. They can further include the likelihood that seal quality will remain stable long enough to be worth improving. The general guidelines can further consider the degree to which a user's hearing can be protected by a good seal.

In some circumstances, it can be determined that a user is likely to be interested in audio quality, though a specific context might not be present. For example, a user's environment might be fairly quiet (for example, as determined by audio device 100 or an associated electronic device, sch as a watch), or a user might be primarily stationary (for example, as determined by an accelerometer in audio device 100 or an associated electronic device.) A user might have already adjusted audio device 100 (shown in FIG. 1) multiple times (for example, as determined by an accelerometer in audio device 100 or an associated electronic device.) As shown in column 510, in situations where a user is likely to be interested in audio quality, testing can be performed more often. The type of test signal could be inaudible to the user. Testing could be done when an app that indicates that a user is likely to be interested in audio quality begins providing an audio signal. Such an app could be a music app or other app. The threshold could be set fairly high to help the user achieve good results. Results can be provided on a pop-up or panel on an associated electronic device, though tactile feedback through audio device 100 or an associated electronic device could be used. The notifications can inform the user of a poor seal. The notifications can further include suggestions to the user.

In some circumstances, it can be determined that a good seal is unlikely to last, though a specific context might not be present. For example, a user might be accelerating or changing the direction of audio device 100 at a rapid rate (for example, as determined by an accelerometer in audio device 100 or an associated electronic device.) The user might be in transit (for example, as determined by a global-positioning system running on an associated electronic device.) As shown in column 520, in situations where a good seal is unlikely to last, testing can be reduced or eliminated. The type of test signal could be inaudible to the user. Testing could be done when a user changes the app that is providing an audio signal to audio device 100. The threshold could be set low or to zero. Results can be provided on a rare occasion, and the notifications can inform the user of a poor seal. The notifications can further include suggestions to the user.

In some circumstances, it can be determined that a good seal would likely protect a user's hearing, though a specific context might not be present. For example, a user might be in a location where loud noises, either sudden or sustained, have been previously encountered (for example, as determined by a global-positioning system running on an associated electronic device.) For situations where a good seal is likely to protect a user's hearing, a user might have a heightened interest in ensuring a quality seal. The type of test signal could be inaudible to the user, though an audible test signal might be used in some situations. As shown in column 530, at these times, testing could be done on a more frequent basis. In such a situation, real-time feedback can be useful in order to protect a user's hearing. The threshold for determining an acceptable seal could be set to a higher level to help protect the user's hearing. Feedback could be provided to a user when a poor seal is detected, and there might be reason for notifications that a good seal is present. The notifications might be non-audio, for example the notifications could be provided using a haptic engine or other component of audio device 100 or associated electronic device. A visual pop-up, panel, or tactile response provided an associated electronic device could still be useful as well. The notifications can inform the user of a poor seal. The notifications can inform the user of a good seal. The notifications can further include suggestions to the user, as well as warnings of the present ambient level.

Notifications made when a good seal would likely protect a user's hearing can be interactive. For example, a user can be notified of a risk to a user's hearing and a poor seal quality. A recommendation to improve seal quality can be included, along with suggestions as appropriate. The suggestions can be to "remove and replace," "remove, clean, and replace," and others. Once a good seal is detected, a notification that the seal has been improved can be provided, typically in the same manner that a notification of a poor seal was made. In some circumstances, a user might be in high-risk environment with transparency on. Accordingly, embodiments of the present invention can provide an adjustable level of transparency. A user can be warned that a level of transparency might be too high when such an environment. For example, an estimation of the actual sound volume reaching the user can be made based on a reading of the ambient volume and the level of transparency. When in a high-risk environment, the user can be warned to move from the environment or reduce the level of transparency. Alternatively, the level of transparency could be automatically adjusted by audio device 100 or an associated electronic device.

FIG. 6 illustrates a default context and corresponding guidelines that can form part of a framework for making decisions for providing a notification regarding a quality of a seal formed using an audio device according to an embodiment of the present invention. In some circumstances, no specific context might be applicable, and no information that would indicate which general guideline to use might be present. In such a case, a default set of guidelines can be used. In these and other embodiments of the present invention, the default set of guidelines can be used when a specific context is not present, or they can be used at all times. The default guidelines can provide for a test signal that is inaudible to the user. As shown in column 610 of table 600, at these times, testing could be done on a periodic basis. The threshold for determining an acceptable seal could be set to a moderate level. Feedback could be provided to a user when a poor seal is detected. Notifications that a good seal is present might be useful when audio device 100 (shown in FIG. 1) is removed from a case. Feedback could be audible, or feedback can be provided using a haptic engine or other component of audio device 100 to provide a prompt to the user. The notifications can further include suggestions to the user.

The suggestions provided to help a user improve a quality of a seal, and the method by which they are provided, can be context dependent as well. For example, suggestions such as remove and replace audio device 100 or remove, clean, and replace audio device 100, can be made with each notification of a poor fit. These can be provided using audible signals from audio device 100, they can appear as pop-ups or panels on an associated electronic device, or they can be provided in other ways. Suggestions to change a size of an ear-tip 110 (shown in FIG. 1), cushion, or other portion of audio device 100 can be made when audio device 100 is used for the first time. Suggestions following an initial usage can likely be provided using audible signals from audio device 100, though they can appear as pop-ups or panels on an associated electronic device, or they can be provided in other ways.

The suggestions provided to help a user improve a quality of a seal can be improved by tracking seal quality over time. This data can be stored solely on a user's device, such as a phone, or on audio device 100 itself. As an example, a suggestion to replace ear-tip 110 can be made when seal quality is tracked over time. That is, as ear-tip 110, cushion, or other portion of audio device 100 ages, a degradation of seal quality over time can be tracked. At a certain time, it can become advantageous for the ear-tip 110, cushion, or other portion to be replaced, and the user can be notified accordingly. Since degradation can be tracked, it can be desirable for some users to employ ear-tip 110, cushion, or other portion formed of a material that provides a better audio quality even if it is not as durable. Appropriate suggestions such as custom molding or other alternatives can be suggested to the user. This can be true when foam or other materials are used. Since a user can be alerted to replace ear-tip 110, cushion, or other portion, durability might not be paramount for some users. An example is shown in the following figure.

Figure 7:
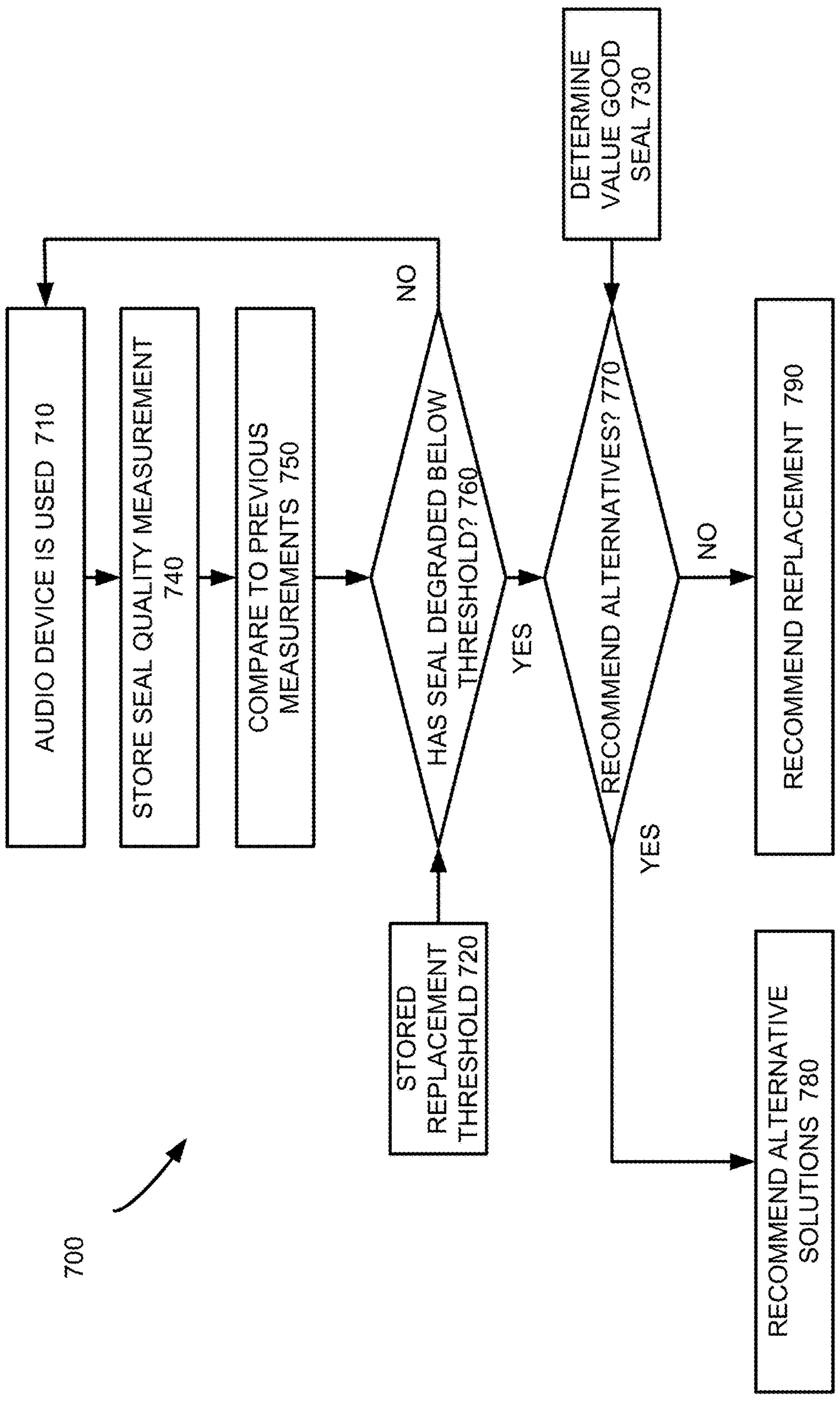
FIG. 7 illustrates a method of determining whether to recommend the replacement of a portion of an audio device according to an embodiment of the present invention.

FIG. 7 illustrates a method of determining whether to recommend the replacement of a portion of an audio device according to an embodiment of the present invention. In flowchart 700, audio device 100 (shown in FIG. 1) can be used in act 710 and a seal measurement can be stored in act 740. The seal measurement that is stored can be a measurement that was made when a good seal was achieved, though with severe degradation of a portion of audio device 100 such a seal might not be possible. In act 750, the seal quality can be compared to previously stored measurements. In act 760, it can be determined whether the seal has degraded below a threshold. This threshold can be stored in act 720. The threshold stored in act 720 and used in act 760 can be predetermined, it can be based on user preference or input, or it can be determined in another manner.

Once the portion of audio device 100, such as ear-tip 110 (shown in FIG. 1) or a cushion of headphone, has degraded beyond the threshold amount, a decision can be made as to what to recommend to the user. Such a recommendation can be to replace the portion of audio device 100 with a similar portion. The suggestion can be to replace the portion of audio device 100 with a different or alternative portion that is made of a different material, is custom made to fit, or is different in some other way.

This question can be thought of as a value proposition, where an answer can be dependent on the value of a good seal to a user. Accordingly, in act 770, it can be determined whether to recommend an alternative solution instead of recommending a direct replacement of the portion of audio device 100. This determination can be made by factoring in a value of a good seal to a user, shown here as a value stored in act 730. This value can be provided by a user. The value can be determined by the contexts that a user is likely to engage in with audio device 100. For example, if a user often listens to music with audio device 100, the value of a good seal to the user might be high. If the user solely exercises with audio device 100, the value of a good seal might be low.

If the value of a good seal is low, then a direct replacement can be suggested in act 790. Alternative suggestions can also be provided at this time. If the value of a good seal is high, then a recommendation for alternative solutions can be made in act 780. The decision to recommend alternative solutions can be based on other factors as well, such as the likelihood of significant improvement for the user, where the likelihood of significant improvement is based at least in part on a history of consistently poor seals.

The alternative solutions can include replacements made of a different material, such as foam or other material. The alternative solutions can include replacements that are custom-made. For example, a user might send a picture of each ear to a vendor who then makes custom ear-tips 110 or cushions.

Tracking seal quality over time can also provide information leading to a suggestion to try a different sized ear-tip 110. That is, a consistently poor seal can be indicative of a wrong sized ear-tip 110, cushion, or other portion of audio device 100. Accordingly, a user can be notified that a different size would improve performance and can be directed as how to receive or procure one. To help facilitate this, audio device 100 or associated electronic device can store a present size of ear-tip 110, cushion, or other portion. The present size can be stored during an initial setup, where a user is asked what size ear-tip 110, cushion, or other portion is being used. The present size can be read and stored by audio device 100 reading a bar code or other information on ear-tip 110, cushion, or other portion. When the present size is known, different sizes can be suggested based on seal quality. In these and other embodiments of the present invention, audio device 100 or associated electronic device can determine that a custom ear-tip 110, cushion, or other portion might be necessary for a desired quality of seal. Appropriate suggestions such as custom molding or other alternatives can be suggested to the user.

The ability to provide suggestions can further be used to help to conserve resources. For example, a median-sized ear-tip 110, cushion, or other portion of audio device 100 can be included with audio device 100. If this median sized portion is not adequate, the user can be directed as how to receive or procure a more appropriate size. This can reduce an amount of waste that can otherwise be generated by providing multiple sized ear-tips 110, cushions, or other portions with each audio device 100.

Again, the fit of an ear-tip 110, cushion, or other portion of audio device 100 can be determined and used as a proxy for seal quality. For example, temperature sensor 104 (shown in FIG. 1) in or near ear-tip 110, cushion, or other portion can be used to determine how well ear-tip 110, cushion, or other portion fits in a user's ear canal. If a temperature near an expected body temperature is reached, a determination that a good fit is present can be made. If a temperature below the expected body temperature is reached, a determination that a poor fit is present can be made. This determination of a good fit can be used to determine that a good quality seal is present. A drop in temperature can indicate that fit and therefor seal quality is similarly reduced.

These and other embodiments of the present invention can provide various health benefits. For example, seal quality and body temperature can be measured independently, and body temperature can be tracked to help determine the onset of illness. This data can be stored solely on a user's device, such as a phone, or on audio device 100 itself. A poor seal can be used to determine that temperature measurements might not be accurate and a user can be notified accordingly. The seal test results can also be stored with the temperature data as an indication of reliability, or temperature data corresponding to poor seal test results can be disregarded. The seal tests can be performed before and after the temperature measurements in order to help validate the accuracy of the temperature data. Since several validation tests might be necessary, the test signals used can be inaudible to the user.

Again, embodiments of the present invention can be particularly useful in protecting hearing in a loud environment. Embodiments of the present invention can further provide noise cancellation to block undesired sounds. When it is desirable to listen to a loud audible source, such as at a concert, embodiments of the present invention can provide an adjustable amount of transparency and can limit the volume of the audio signal that reaches a user's ear canal. Equalization can be used to improve the quality of the audio signal heard by a user. Equalization can be used to help compensate for remaining imperfections in the seal of audio device 100. The loudness and the seal quality can be tracked, and the data can be stored solely on a user's device, such as a phone, or on audio device 100 itself. Some or all of this loudness and seal data, as well as temperature data, usage data, and other types of data, can be used in providing aggregate assessments of hearing health to users. An example is shown in the following figure.

Figure 8:
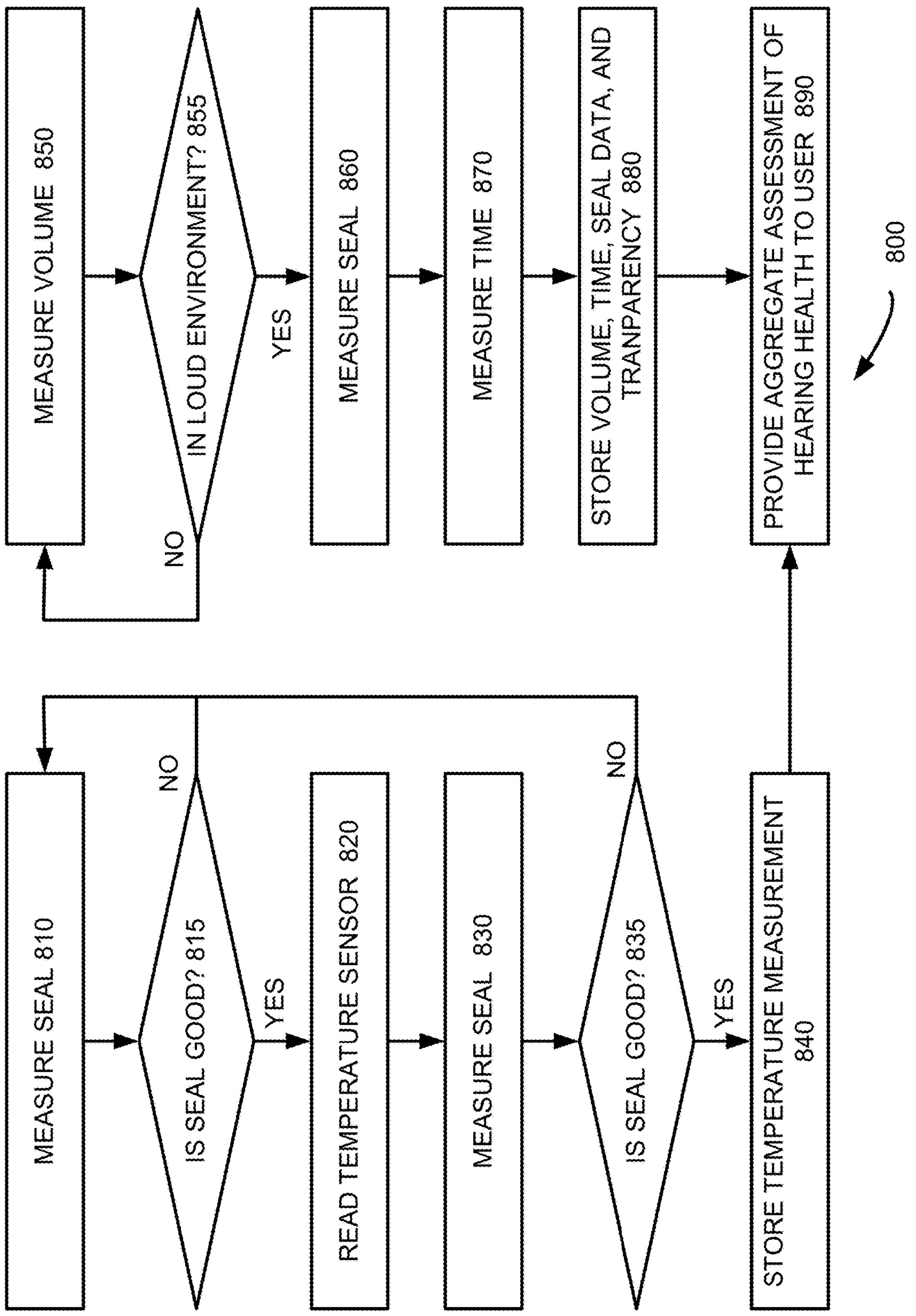
FIG. 8 illustrates a method of providing an aggregate assessments of hearing health to a user.

FIG. 8 illustrates a method of providing an aggregate assessments of hearing health to a user. In acts 810 through 840, a user's temperature can be stored. In acts 850 through 880, the quality of a seal while a user is in a loud environment can be tracked. The temperature data and seal data can be aggregated and provided to a user in act 890.

Specifically, in act 810 of flowchart 800, a seal can be measured and a determination whether the seal is of high quality can be made in act 815. If the seal is good, a temperature sensor, such as temperature sensor 114 (shown in FIG. 1) of audio device 100 (shown in FIG. 1), can be read in act 820. If the seal is not good, the seal can be remeasured later in act 810. Following a temperature reading, the quality of the seal can be measured again in act 835 and a determination of whether the seal is good can be made in act 830. If the seal is good in act 835, then a good seal was found before (in act 815) and after (in act 835) the temperature reading in act 820. This can mean that the likelihood that the temperature reading is accurate can be high, and the temperature data can be stored in act 840. If the seal is not good in act 835, then the seal can be remeasured later in act 810.

Information regarding exposure to loud environments can be useful in providing a health assessment to a user. Accordingly, in act 850, a sound volume can be measured. In act 855, it can be determined whether the environment is loud enough that hearing health could be at risk. If it is not, then sound volume can be remeasured later in act 850. If hearing health could be at risk, then in act 860 the quality of a seal can be measured. Since risk to hearing is cumulative, a time that the user is in the loud environment can be measured in act 870. In act 880, the volume, time, and seal data can be stored. The risk to hearing can be based on the actual level of sound that reaches the user. Accordingly, in act 880, data regarding the level of transparency can be stored as well. In act 890, this data, along with user temperature data, can be provided as part of an aggregate assessment of hearing health to the user.

The activities involved in providing a notification regarding a seal can be allocated among devices in various ways. For example, a determination of when to test seal quality can be made by an associated electronic device, such as a phone that is paired with audio device 100, though this determination can be made by audio device 100 in some embodiments of the present invention. The type of test signal to use can be determined by the associated electronic device and appropriate instructions can be sent by the associated electronic device to audio device 100. Audio device 100 can instead receive an instruction from the associated electronic device to send a test signal and audio device 100 can determine the test signal to send. Audio device 100 can compare an amount of leakage to a threshold, determine a quality of a seal, and provide the results to either the user or an associated electronic device. Audio device 100 can instead provide an indication of an amount of leakage to the associated electronic device, and the associated electronic device can then determine the quality of the seal. The determination of whether to provide test results can be done by either audio device 100 or an associated device. The manner in which test results are provided, and the actual test results, can be provided by either audio device 100 or an associated electronic device. Suggested solutions can be provided by an associated electronic device, audio device 100, or by another device. Relevant data and other information can be shared among audio device 100 and one or more associated electronic devices using commands, flags, data, or other types of signals.

The notifications provided to a user can be interactive. For example, a notification can inform the user of a poor seal. The notification can provide an option to stop further interaction, or it can provide an option for further information. The further information can include suggestions on how to improve the seal, such as "remove and replace," "remove, clean, and replace," or others. The further information can include suggestions for replacements or alternative solutions. After audio device 100 has been removed and replaced, a further notification informing the user as to whether the seal is good or the seal is poor can be made. Examples of audio device 100 and associated electronic devices providing notifications are shown in the following figures.

Figure 9A:
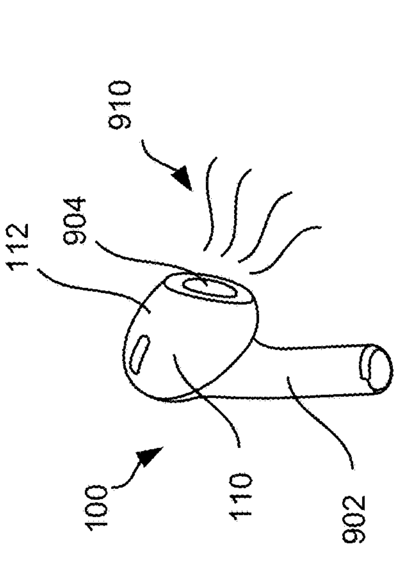
FIGS. 9A through 9C illustrate an audio device and example associated electronic devices providing notifications according to embodiments of the present invention.
Figure 9B:
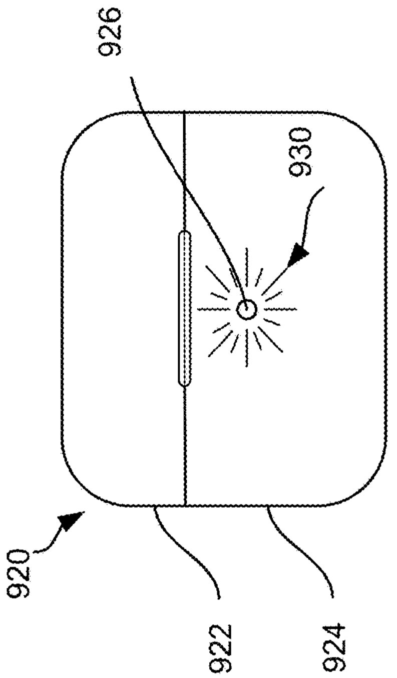
Figure 9C:
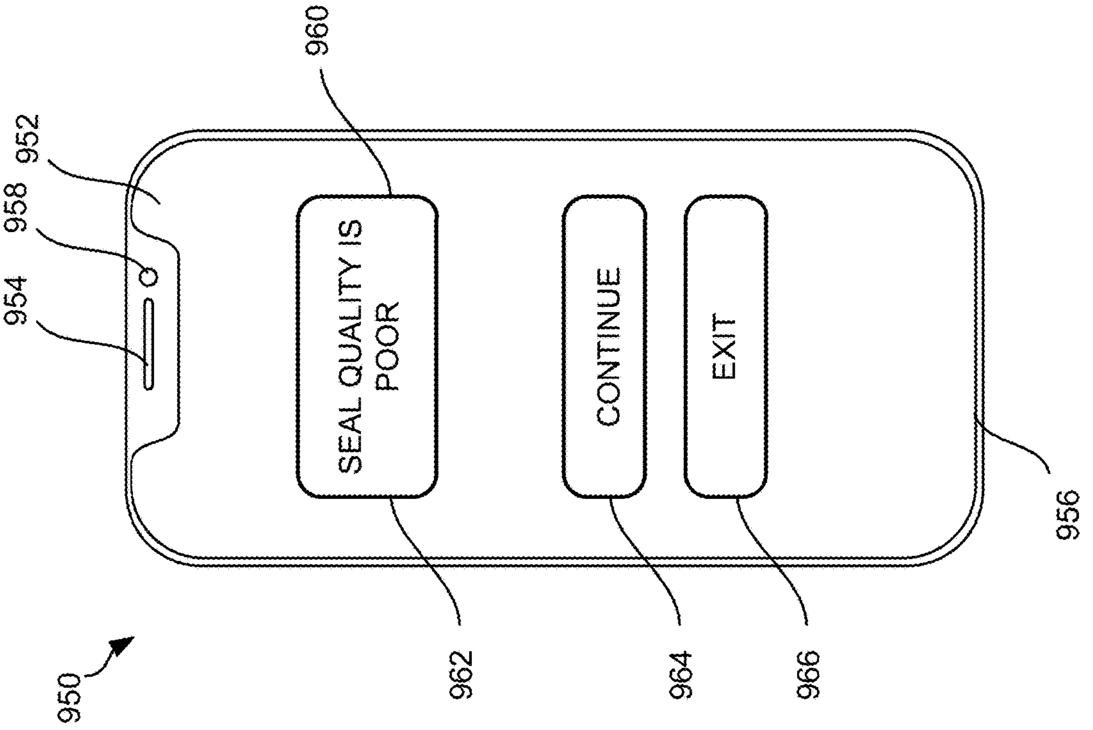

FIGS. 9A through 9C illustrate an audio device and example associated electronic devices providing notifications according to embodiments of the present invention. FIG. 9A illustrates audio device 100 providing a notification 910 using speaker 904. Audio device 100 can include ear-tip 110 and stem 902. As before, ear-tip 110 can fit in a user's ear canal 120 and form a seal along perimeter 112. Audio device 100 can provide test signals and notifications 910 using speaker 904. The notifications 910 can be verbal or other sounds, such as tones, musical notes, or other audible signal. Audio device 100 can provide notifications in other ways. For example, audio device 100 can provide tactile notifications using a haptic engine (not shown), low frequency pulses using speaker 940, or in other ways. While audio device 100 is shown here as an in-ear device or ear-bud, audio device 100 can be on-ear headphones, over-ear headphones, or other audio device.

FIG. 9B illustrates an example associated electronic device providing a notification according to an embodiment of the present invention. Example associated electronic device 920 is shown as a case that can support and aid in charging one, two, or more than two audio devices 100 (shown in FIG. 9A.) Example associated electronic device 920 can be paired with one or more audio devices 100, such as a right and a left audio device 100. Example associated electronic device 920 can include a base 924 for supporting the audio devices 100 and a lid 922. Example associated electronic device 920 can include one or more light-emitting diodes (not shown) that can provide light at opening 926. Example associated electronic device 920 can provide notification 930 at opening 926 using light or an absence of light. The light can have a color that indicates a quality of a seal formed using audio device 100. For example, a first color can indicate that a good seal has been detected. A second color can indicate that a poor seal has been detected. The light can be pulsed following a particular pattern to indicate a quality of a seal formed using audio device 100. For example, the light forming notification 930 can pulse when a poor seal has been detected and stop flashing when a good seal has been detected. The one or more light-emitting diodes can provide other information regarding the charged state of one or more audio device 100, the charged state of example associated electronic device 920, the status of pairing between audio devices 100 and example associated electronic device 920, or other information.

FIG. 9C illustrates an example associated electronic device providing a notification according to an embodiment of the present invention. Example associated electronic device 950 is shown as a portable computing device, such as a phone. Example associated electronic device 950 can be paired with one or more audio devices 100, one or more example associated electronic devices 920 (shown in FIG. 9B), or other device. Example associated electronic device 950 can include a screen 952, speaker 954, speaker 956, and light-emitting diode 958. Example associated electronic device 950 can provide notification 960 using screen 952. Notification 960 can include a visual notification as message 962 regarding the quality of a seal formed by audio device 100. The visual notification or message 962 can include text, color, or other symbols. Message 962 can instead include a region or area of screen 952 being set to a specific color, icon, graphic, animated image, or other symbol. Message 962 and other portions of notification 960 can be set to flash at a specific rate. Notification 960 can include message 962 informing a user of the status of a seal formed by audio device 100. Notification 960 can include additional messages, for example an exit message 966 that can be selected if the user does not wish to improve the seal. Notification 960 can include continuation message 964, which can be an option to continue and receive further information regarding improving the seal. This further information can include suggestions on how to improve the seal, such as "remove and replace," "remove, clean, and replace," or others. The further information can include suggestions for replacements or alternative solutions. After audio device 100 has been removed and replaced, a further notification informing the user as to whether the seal is good or the seal is poor can be made.

Example associated electronic device 950 can provide notifications using light-emitting diode 958. Light-emitting diode 958 can have a color, or lack of color, that indicates a quality of a seal formed using audio device 100. For example, a first color can indicate that a good seal has been detected. A second color can indicate that a poor seal has been detected. Light from light-emitting diode 958 can be pulsed following a particular pattern to indicate a quality of a seal formed using audio device 100. For example, the light can pulse when a poor seal has been detected and stop flashing when a good seal has been detected. Light-emitting diode 958 can provide other information regarding the state of example associated electronic device 950.

In some circumstances, example associated electronic device 950 can provide notification 960 using one or more of speaker 954 and speaker 956. These circumstances might be limited since the presence of audio device 100 can prevent a user from hearing a notification. However, when audio device 100 is operating in a transparent mode, a user might be able to hear an audible notification provided by one or more of speaker 954 and speaker 956. Example associated electronic device 950 can instead provide tactile feedback, for example using a haptic engine (not shown.)

The quality of an acoustic seal can be key to the performance of advanced features such as active noise cancellation, transparency, adaptive transparency, hearing protection, hearing assessment technologies, hearing augmentation and others, primarily due to the requirement of passive attenuation at higher frequencies where active feedback loops cannot effectively function. The quality of a seal can be variable especially as users move, sweat, touch the device for UI controls, and exercise. Providing information regarding the seal actively in a phone user interface, watch user interface, or even via spoken feedback on the audio devices can provide user feedback to allow the user to adjust for the best performance. Further steps, such as resizing or replacing a tip can be taken if poor seal quality is a consistent issue. That is, resizing or replacing the tip can be a recommendation the user interface provides when seal issues are frequently detected.

As described herein, one aspect of the present technology is the gathering and use of data available from specific and legitimate sources to improve the delivery to users of content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of providing a notification regarding a quality of a seal formed using an audio device, the method comprising, with an electronic device that is associated with the audio device:

determining whether the audio device is being used in one of a number of specific contexts, the specific contexts comprising listening to music, exercising, and sleeping, and if it is, then determining the quality of the seal based at least in part on the specific context in which the audio device is being used, and if the quality of the seal is determined to be poor, then providing a notification that the quality of the seal is poor, and if the quality of the seal is not determined to be poor, then not providing a notification that the quality of the seal is poor.

2. The method of claim 1 wherein the notification is provided at a display of the associated electronic device.

3. The method of claim 1 wherein the notification is provided by light emitted a light-emitting diode on a case for the audio device.

4. The method of claim 1 wherein a determination that audio device is being used during exercise comprises, with the associated electronic device, receiving accelerometer information from the audio device.

5. The method of claim 1 further comprising:

if the associated electronic device determines that the audio device is not being used in one of the number of specific contexts, then determining whether the audio device is being used in one of a number of general contexts, and if it is, then determining the quality of the seal based at least in part on the general context in which the audio device is being used, and if the quality of the seal is determined to be poor, then providing a notification that the quality of the seal is poor, and if the quality of the seal is not determined to be poor, then not providing a notification that the quality of the seal is poor.

6. The method of claim 5 wherein the notification is provided at a display of the associated electronic device.

7. The method of claim 5 wherein the notification is provided by light emitted by a light-emitting diode on a case for the audio device.

8. The method of claim 5 further comprising:

if the associated electronic device determines that the audio device is not being used in one of the number of general contexts or one of the number of specific contexts, then determining the quality of the seal based on a default guideline, and if the quality of the seal is determined to be poor, then providing a notification that the quality of the seal is poor, and if the quality of the seal is not determined to be poor, then not providing a notification that the quality of the seal is poor.

9. The method of claim 1 wherein the providing the notification comprises, with the associated electronic device:

determining when to test the seal;

determining a type of test signal to use;

receiving an indication regarding a quality of the seal; and determining whether to provide the notification to a user.

10. A method of providing a notification regarding a quality of a seal formed using an audio device, the method comprising, with an electronic device that is associated with the audio device:

determining whether the audio device is being used in one of a number of specific contexts, and if it is, then determining the quality of the seal based at least in part on the specific context in which the audio device is being used, and if the quality of the seal is determined to be poor, then providing a notification that the quality of the seal is poor, and if the quality of the seal is not determined to be poor, then not providing a notification that the quality of the seal is poor;

receiving an indication of a quality of the seal formed by the audio device;

when an indication that a poor seal is formed is received from the audio device, not saving data regarding the quality of the seal;

when an indication that a good seal is formed is received from the audio device, storing information regarding the time that the quality of the seal was determined and the indication of the quality of the seal; and comparing the stored indication of the quality of the seal to previous indications of the quality of seal, and determining whether the indications of the quality of seal have degraded a threshold amount, and if the associated device determines that the indications of the quality of seal have degraded the threshold amount, then determining whether to provide the notification to recommend an alternative solution or replacement for the portion of the audio device forming the seal, and if the associated device determines that the indications of the quality of seal have not degraded the threshold amount, then not providing a notification to recommend an alternative solution or replacement for the portion of the audio device forming the seal.

11. The method of claim 10 further comprising, with the associated electronic device, determining to provide the notification to recommend an alternative solution or replacement for the portion of the audio device forming the seal, and sending an instruction to the audio device to audibly provide the notification using a speaker of the audio device to recommend an alternative solution or replacement for the portion of the audio device forming the seal.

12. The method of claim 10 further comprising, with the associated electronic device, determining to provide the notification to recommend an alternative solution or replacement for the portion of the audio device forming the seal, and providing the notification on a screen of the associated electronic device recommending an alternative solution or replacement for the portion of the audio device forming the seal.

13. The method of claim 10 wherein determining whether to provide the notification to recommend an alternative solution or replacement comprises, with the associated electronic device:

determining a value of a good seal to a user;

determining an improvement provided by an alternative solution;

if the determined value of a good seal is sufficient to justify the determined improvement, then providing a notification on a screen of the associated electronic device recommending the alternative solution for the portion of the audio device forming the seal; and if the determined value of a good seal is not sufficient to justify the determined improvement, then providing a notification on a screen of the associated electronic device recommending replacement for the portion of the audio device forming the seal.

14. The method of claim 13 wherein the value of a good seal is determined by user input.

15. The method of claim 13 wherein the value of a good seal is determined based on usage history.

16. A method of providing a notification regarding a quality of a seal formed using an audio device, the method comprising, with an electronic device that is associated with the audio device:

determining whether the audio device is being used in one of a number of specific contexts, and if it is, then determining the quality of the seal based at least in part on the specific context in which the audio device is being used, and if the quality of the seal is determined to be poor, then providing a notification that the quality of the seal is poor, and if the quality of the seal is not determined to be poor, then not providing a notification that the quality of the seal is poor;

receiving a first indication regarding a quality of a seal formed by the audio device;

receiving temperature sensor data from the audio device;

receiving a second indication of a quality of the seal formed by the audio device; and if the first indication and the second indication are that the seal is of sufficient quality, then storing data temperature sensor data received from the audio device, and if either the first indication or the second indication are that the seal is not of sufficient quality, then not storing temperature sensor data received from the of the audio device.

17. The method of claim 16 further comprising, with the associated electronic device:

receiving an ambient sound volume;

receiving an indication of a quality of the seal formed by the audio device; and storing the ambient sound volume and the indication of the seal quality.

18. The method of claim 17 further comprising:

receiving a duration that the audio device is receiving the measured sound volume at the measured seal quality and storing the duration with the ambient sound volume and the indication of the seal quality.

19. The method of claim 18 further comprising providing an aggregate assessment of hearing health on a screen of the associated electronic device using the stored duration, the ambient sound volume, and the indication of the seal quality.

* * * * *